(12) United States Patent
Kupratis et al.

(10) Patent No.: US 11,377,219 B2
(45) Date of Patent: Jul. 5, 2022

(54) SYSTEMS AND METHODS FOR HYBRID ELECTRIC GAS TURBINE ENGINES

(71) Applicant: RAYTHEON TECHNOLOGIES CORPORATION, Farmington, CT (US)

(72) Inventors: Daniel Kupratis, Wallingford, CT (US); Gary Roberge, Tolland, CT (US)

(73) Assignee: Raytheon Technologies Corporation, Farmington, CT (US)

(*) Notice: Subject to any disclaimer, the term of this patent is extended or adjusted under 35 U.S.C. 154(b) by 155 days.

(21) Appl. No.: 16/852,129

(22) Filed: Apr. 17, 2020

(65) Prior Publication Data
US 2021/0323685 A1    Oct. 21, 2021

(51) Int. Cl.
| | | |
|---|---|---|
| *B64D 27/20* | (2006.01) | |
| *F02K 3/06* | (2006.01) | |
| *B64D 27/24* | (2006.01) | |
| *B64D 27/14* | (2006.01) | |
| *F02C 7/36* | (2006.01) | |
| *B64D 27/02* | (2006.01) | |
| *B64D 33/02* | (2006.01) | |

(52) U.S. Cl.
CPC ............ *B64D 27/24* (2013.01); *B64D 27/14* (2013.01); *B64D 27/20* (2013.01); *F02C 7/36* (2013.01); *F02K 3/06* (2013.01); *B64C 2230/04* (2013.01); *B64D 2027/026* (2013.01); *B64D 2033/0226* (2013.01); *B64D 2221/00* (2013.01); *F05D 2220/323* (2013.01)

(58) Field of Classification Search
CPC ........ B64D 27/20; B64D 27/24; B64D 27/02; B64D 2027/026; B64D 2033/0226; F02K 3/06; F02K 3/077
See application file for complete search history.

(56) References Cited

U.S. PATENT DOCUMENTS

| | | | | |
|---|---|---|---|---|
| 3,576,300 A | * | 4/1971 | Palfreyman | B64D 27/20 244/36 |
| 3,936,017 A | * | 2/1976 | Blythe | B64D 33/06 244/110 B |
| 7,665,689 B2 | | 2/2010 | McComb | |
| 7,752,834 B2 | * | 7/2010 | Addis | F02K 3/077 60/224 |

(Continued)

OTHER PUBLICATIONS

European Patent Office, European Partial Search Report dated Jan. 5, 2022 in Application No. 21168570.6.

*Primary Examiner* — Todd E Manahan
*Assistant Examiner* — Thuyhang N Nguyen
(74) *Attorney, Agent, or Firm* — Snell & Wilmer L.L.P.

(57) ABSTRACT

A hybrid electric gas turbine propulsion system may comprise: a first propulsion system, a second propulsion system, and a third propulsion system. The first propulsion system may comprise a first fan, a first turbine, a first compressor, and a first electric motor, the first fan operably coupled to the first turbine and the first compressor by a first shaft, the first shaft coupled to the first electric motor, the first shaft configured to be disposed radially inward of a fuselage of an aircraft. The second propulsion system and the third propulsion system may be in accordance with the first propulsion system. The hybrid electric gas turbine propulsion system may be symmetric about a vertical plane extending through a neutral aerodynamic axis.

20 Claims, 8 Drawing Sheets

(56) References Cited

U.S. PATENT DOCUMENTS

| | | | |
|---|---|---|---|
| 8,820,676 B2* | 9/2014 | Cazals | B64C 29/0033 |
| | | | 244/56 |
| 9,989,011 B2* | 6/2018 | Suciu | F01D 13/003 |
| 10,450,886 B2 | 10/2019 | Sennoun | |
| 10,549,845 B2* | 2/2020 | Epstein | B64C 21/06 |
| 2002/0189230 A1* | 12/2002 | Franchet | F02K 3/075 |
| | | | 60/204 |
| 2016/0017844 A1* | 1/2016 | Suciu | F02K 1/60 |
| | | | 244/53 B |
| 2016/0076446 A1* | 3/2016 | Bailey Noval | F02K 3/06 |
| | | | 60/801 |
| 2016/0102634 A1 | 4/2016 | Suciu et al. | |
| 2017/0184020 A1 | 6/2017 | Miller et al. | |
| 2017/0361939 A1* | 12/2017 | Negulescu | B64D 27/20 |
| 2017/0369179 A1 | 12/2017 | Bradbrook | |
| 2018/0017019 A1* | 1/2018 | Dipietro, Jr. | F02C 9/20 |
| 2018/0257787 A1 | 9/2018 | Hamel et al. | |
| 2018/0291837 A1* | 10/2018 | Roberge | F02K 1/763 |
| 2020/0010189 A1 | 1/2020 | Silkowski | |
| 2020/0010205 A1 | 1/2020 | Swann et al. | |
| 2020/0070995 A1 | 3/2020 | Papas et al. | |
| 2020/0189758 A1* | 6/2020 | Abramian | B64D 27/20 |

* cited by examiner

SYSTEMS AND METHODS FOR HYBRID ELECTRIC GAS TURBINE ENGINES

FIELD

This disclosure relates generally to boundary layer impulse hybrid turbo electric engines, and more particularly for systems and methods for boundary layer impulse hybrid turbo electric engines.

BACKGROUND

A gas turbine engine typically includes a fan section driven by a core engine or gas generating core arranged along a common axis. The core engine includes a compressor section, a combustor section, and a turbine section. Air entering the compressor section is compressed and delivered into the combustion section where it is mixed with fuel and ignited to generate a high-speed exhaust gas flow. The high-speed exhaust gas flow typically expands through the turbine section to drive the compressor and the fan section through a driven shaft.

SUMMARY

A hybrid electric gas turbine propulsion system is disclosed herein. The hybrid electric gas turbine propulsion system may comprise: a first propulsion system comprising a first fan, a first turbine, a first compressor, and a first electric motor, the first fan operably coupled to the first turbine and the first compressor by a first shaft, the first shaft coupled to the first electric motor, the first shaft configured to be disposed radially inward of a fuselage of an aircraft; a second propulsion system comprising a second fan, a second turbine, a second compressor, and a second electric motor, the second fan operably coupled to the second turbine and the second compressor by a second shaft, the second shaft coupled to the second electric motor, the second shaft configured to be disposed radially inward of the fuselage of the aircraft; and a third propulsion system comprising a third fan, a third turbine, a third compressor, and a third electric motor, the third fan operably coupled to the third turbine and the third compressor by a third shaft, the third shaft coupled to the third electric motor, the third shaft configured to be disposed radially inward of the fuselage of the aircraft.

In various embodiments, the first fan mirrors the second fan about a plane that extends from a neutral aerodynamic axis of the aircraft through a longitudinal axis of the first shaft, wherein the longitudinal axis is parallel to the neutral aerodynamic axis, and the longitudinal axis is disposed radially outward of the neutral aerodynamic axis. The hybrid electric gas turbine propulsion system may further comprise a fourth propulsion system comprising a fourth fan, a fourth turbine, a fourth compressor, and a fourth electric motor, the fourth fan operably coupled to the fourth turbine and the fourth compressor by a fourth shaft, the fourth shaft coupled to the fourth electric motor, the fourth shaft disposed radially inward of the fuselage of the aircraft. The hybrid electric gas turbine propulsion system may be configured to provide at least one of pitch control and yaw control of the aircraft. The hybrid electric gas turbine propulsion system may further comprise a gas generating core fluidly coupled to the first compressor and the first turbine, the gas generating core configured to be disposed radially outward from the first compressor. The first fan, the second fan, and the third fan each may be configured to ingest a first boundary layer flow from the fuselage. The first compressor, the second compressor, and the third compressor may each be configured to ingest a second boundary layer flow from the fuselage, the second boundary layer flow aft of the first boundary layer flow. A fan exhaust of the first fan, the second fan, and the third fan may be configured to mix with a turbine exhaust of the first turbine, the second turbine, and the third turbine, and a bypass airflow.

A boundary layer impulse propulsion system is disclosed herein. The boundary layer impulse propulsion system may comprise: a fan section disposed radially inward of a fuselage of an aircraft, the fan section including a plurality of fans disposed circumferentially about a neutral aerodynamic axis of the fuselage, the fan section configured to ingest a first boundary layer airflow from the fuselage; a turbine section disposed aft of the fan section, the turbine section including a plurality of turbines; and a compressor section disposed aft of the turbine section, the compressor section including a plurality of compressors, the compressor section configured to ingest a second boundary layer flow from the fuselage, each compressor in the compressor section in fluid communication with a respective turbine in the turbine section.

In various embodiments, a first fan of the plurality of fans mirrors a second fan of the plurality of fans about a plane that extends from the neutral aerodynamic axis of the aircraft through a longitudinal axis of a first shaft, wherein the longitudinal axis is parallel to the neutral aerodynamic axis, and wherein the longitudinal axis is disposed radially outward of the neutral aerodynamic axis, and wherein the first shaft is operably coupled to a first fan in the plurality of fans, a first turbine in the plurality of turbines, and a first compressor in the plurality of compressors. The boundary layer impulse propulsion system may further comprise a plurality of fan exit ducts, each fan in the plurality of fans fluidly coupled to a respective fan exit duct in the plurality of fan exit ducts. The boundary layer impulse propulsion system may further comprise a plurality of turbine exit ducts, each turbine in the plurality of turbine exit ducts fluidly coupled to a respective turbine exit duct in the plurality of turbine exit ducts. Each turbine exit duct may be configured to reverse an exit airflow of a respective turbine from a forward direction to an aft direction. Each turbine exit duct may include a turbine duct exit axially proximate a fan duct exit of each fan in the plurality of fans. The boundary layer impulse propulsion system may be configured to provide at least one of pitch control and yaw control of the aircraft.

An aircraft is disclosed herein. The aircraft may comprise: a fuselage extending from a forward end to an aft end, the fuselage defining a neutral aerodynamic axis; and a plurality of propulsion systems disposed proximate the aft end of the fuselage, at least a portion of each propulsion system in the plurality of propulsion systems embedded in the fuselage, each propulsion system in the plurality of propulsion systems configured to ingest a boundary layer flow from the fuselage, wherein a first fan of a first propulsion system in the plurality of propulsion systems mirrors a second fan of a second propulsion system in the plurality of propulsion systems a plane extending through the neutral aerodynamic axis.

In various embodiments, each propulsion system in the plurality of propulsion systems comprises a fan operably coupled to a turbine and a compressor by a shaft and an electric motor coupled to the shaft. Each propulsion system in the plurality of propulsion systems may further comprise a gas generating core disposed radially outward from the shaft, the gas generating core in fluid communication with the compressor and the turbine. The aircraft may further comprise a nozzle section disposed proximate the aft end of the fuselage, the nozzle section configured to receive a mixture of a bypass airflow a fan exhaust airflow from each fan, and a turbine exhaust airflow from each turbine. The plurality of propulsion systems may be configured to provide at least one of pitch control and yaw control of the aircraft.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

Figure 1:
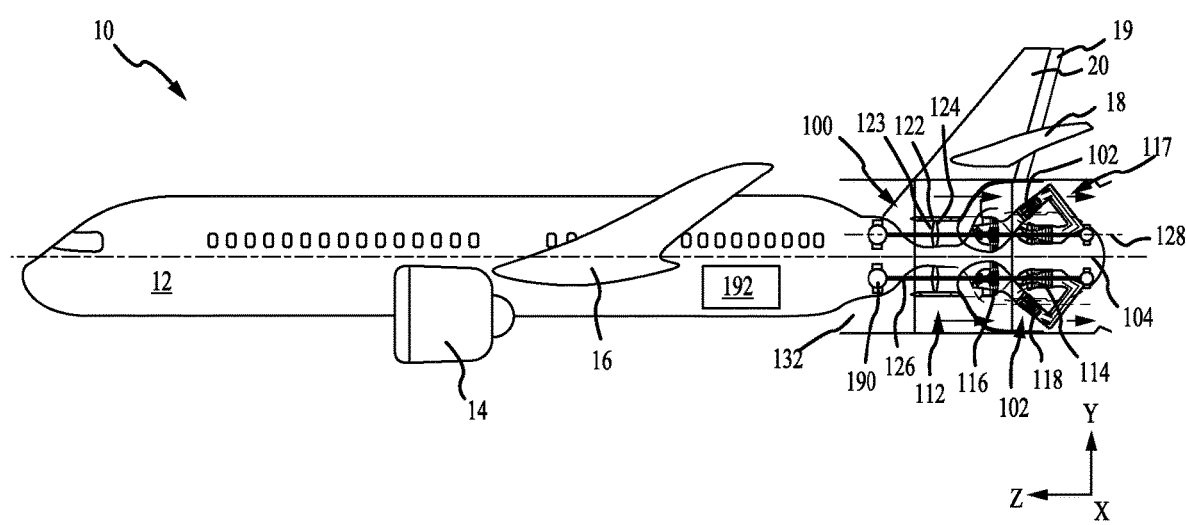
FIG. 1 illustrates a partial cross-sectional view of an aircraft, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

Hybrid electric gas turbine engines, as disclosed herein, implement thrust derived from impulses to a boundary layer flow of an aircraft fuselage. In various embodiments, boundary layer flow may be drawn through the hybrid electric gas turbine engine via (1) fan intake pumping; (2) fan exhaust entrainment of bypass flow; (3) low pressure compressor (LPC) intake pumping; (4) low pressure turbine (LPT) exhaust entrainment of bypass flow; and (5) ram through bypass, which may be dependent on flight speed). In various embodiments, the hybrid electric gas turbine engine may be configured for noise suppression and noise abatement. For example, a plurality of fans may be embedded in the fuselage for noise abatement, the fan exhaust may mix with boundary layer flow, and the LPT exhaust may mix with fan exhaust boundary layer bypass flow. In various embodiments, the hybrid electric gas turbine engine may be configured for ice ingestion tolerance (e.g., shredded ice trajectory may pass through the bypass duct). In various embodiments, the plurality of fans and a plurality of LPC may be offset proximate a fuselage centerline. In various embodiments, the plurality of fans may include a smaller diameter and/or higher tip speeds compared to typical gas turbine engines. In various embodiments, the hybrid electric gas turbine engine may comprise faster motor rotations per minute (RPMs) for higher efficiency relative to typical hybrid electric gas turbine engines. In various embodiments, the hybrid electric gas turbine engine may include a plurality of gas generating cores, which may be line replaceable units for the hybrid electric gas turbine engine. In various embodiments, the hybrid electric gas turbine engine may include electric load sharing with additional clutches.

In various embodiments, a boundary layer flow from a fuselage ingested radially inward within the fuselage is slower than a free stream flight velocity of the airplane. In this regard, scrubbing wash along the fuselage 12 slows down the airfoil in the boundary layer. Although an efficiency of a fan ingesting boundary layer flow from a fuselage may lose aerodynamic efficiency relative to a fan exposed to a free stream velocity, ingesting the boundary layer increases a propulsive efficiency of an embedded propulsion system configured to ingest boundary layer flow.

FIG. 1 schematically illustrates a hybrid electric gas turbine propulsion system 100 disposed in a fuselage 12 of an aircraft 10, in accordance with various embodiments. The hybrid electric gas turbine propulsion system 100 may comprise a boundary layer impulse propulsion system. In various embodiments, the aircraft 10 may further comprise a wing 16 and a gas turbine engine 14. The gas turbine engine 14 may be coupled to the wing 16 by a nacelle, or the like. The hybrid electric gas turbine propulsion system 100 includes a plurality of propulsion systems 102 disposed circumferentially about a neutral aerodynamic axis 104 of the aircraft 10. In various embodiments, the hybrid electric gas turbine propulsion system 100 may comprise at least three propulsion systems. In various embodiments, the hybrid electric gas turbine propulsion system 100 may comprise four propulsion systems. In various embodiments, the hybrid electric gas turbine propulsion system 100 may be symmetric about an X-Z plane extending through the neutral aerodynamic axis 104 and symmetric about an Y-Z plane extending through the neutral aerodynamic axis 104. In this regard, in various embodiments, the hybrid electric gas turbine propulsion system 100 may be configured to provide pitch and/or yaw control of the aircraft 10 at an aft end of aircraft 10.

In various embodiments, the hybrid electric gas turbine propulsion system 100 may further comprise an outer shroud 130 disposed radially outward from the fuselage 12 at an aft end of aircraft 10. The outer shroud 130 and the fuselage 12 may define an inlet 132 of the hybrid electric gas turbine propulsion system 100. The inlet 132 may be configured to receive a boundary layer flow over fuselage 12 during operation of the hybrid electric gas turbine propulsion system. In various embodiments, flow into the inlet 132 may be tuned to minimize spillage drag as a function of various parameters (e.g., flight velocity, aircraft attitude (inclination), and side winds).

Each propulsion system in the plurality of propulsion systems 102 may comprise a fan section 112, a compressor section 114, a turbine section 116, an exhaust duct 117, at least one gas generating core 118, and an electric motor 190. The electric motor 190 may drive a shaft 126 of a respective propulsion system in the plurality of propulsion systems 102. The fan section 112 of each propulsion system may comprise an electric fan. Similarly, the compressor in the compressor section 114 of each propulsion system may comprise an electric compressor. The turbine in a turbine section 116 of each propulsion system may comprise an electric turbine. In various embodiments, the electric motor 190 may drive the shaft 126 of a respective propulsion system. In turn, the shaft 126 may drive the fan section 112, the compressor section 114, and turbine section 116 of a respective propulsion system in the plurality of propulsion systems 102.

The fan section 112 may include a fan case 122 that receives a fan 124 of each propulsion system. The fan 124 extends from a rotating hub 123 coupled to the shaft 126 of a respective propulsion system. The rotating hub 123 and plurality of fans 124 are driven by a shaft 126 (e.g. a single spool) that extends between the fan section 112, through the turbine section 116 and the compressor section 114 along a longitudinal axis 128. The longitudinal axis 128 of each propulsion system in the plurality of propulsion systems 102 may be parallel and equidistant from neutral aerodynamic axis 104 from any other propulsion system in the plurality of propulsion systems 102. The shaft 126 extends from the fuselage 12 at a forward end of the hybrid electric gas turbine propulsion system 100 through the fuselage to a tail end of the fuselage 12 and rotate the fan 124 and the hub 123 about the longitudinal axis 128. In various embodiments, the shaft 126 is operatively coupled to the fan 124 and the hub 123.

In various embodiments, the hybrid electric gas turbine propulsion system 100 may comprise a battery system 192 disposed in the fuselage 12 of aircraft 10. The battery system 192 may be electrically coupled to the electric motor 190 of each propulsion system in the plurality of propulsion systems 102.

Figure 2A:
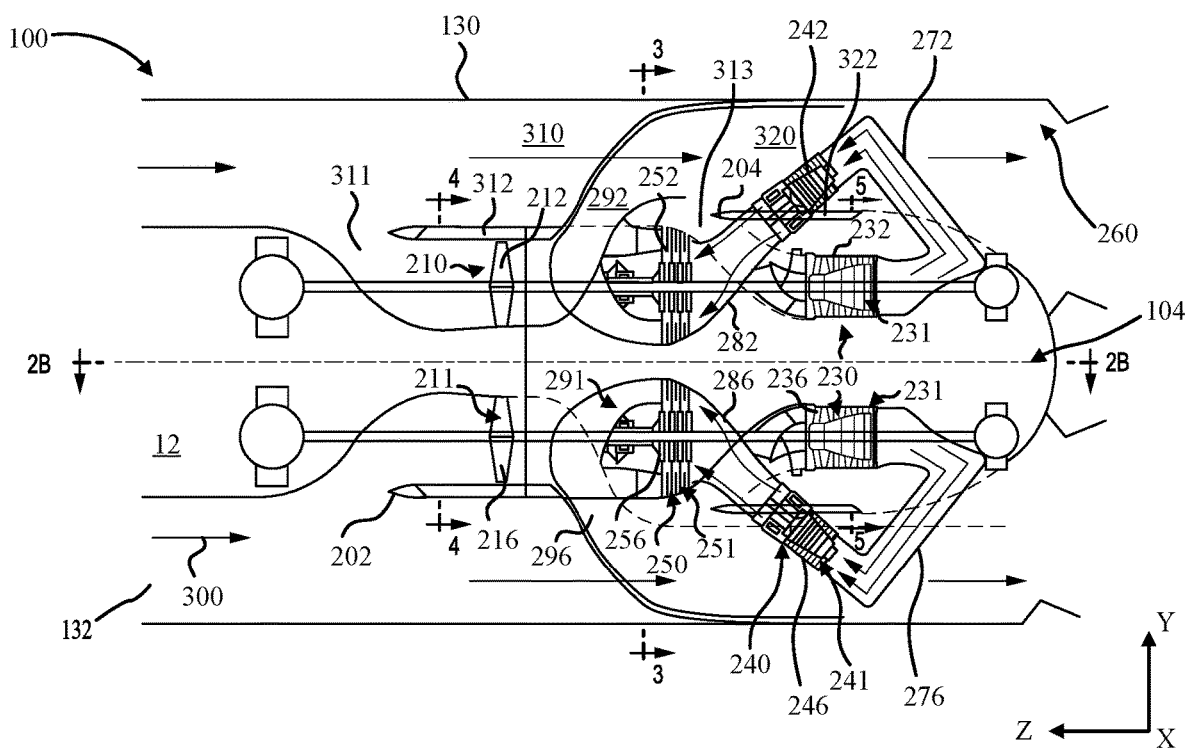
FIG. 2A illustrates a schematic view of a hybrid electric gas turbine propulsion system, in accordance with various embodiments.
Figure 2B:
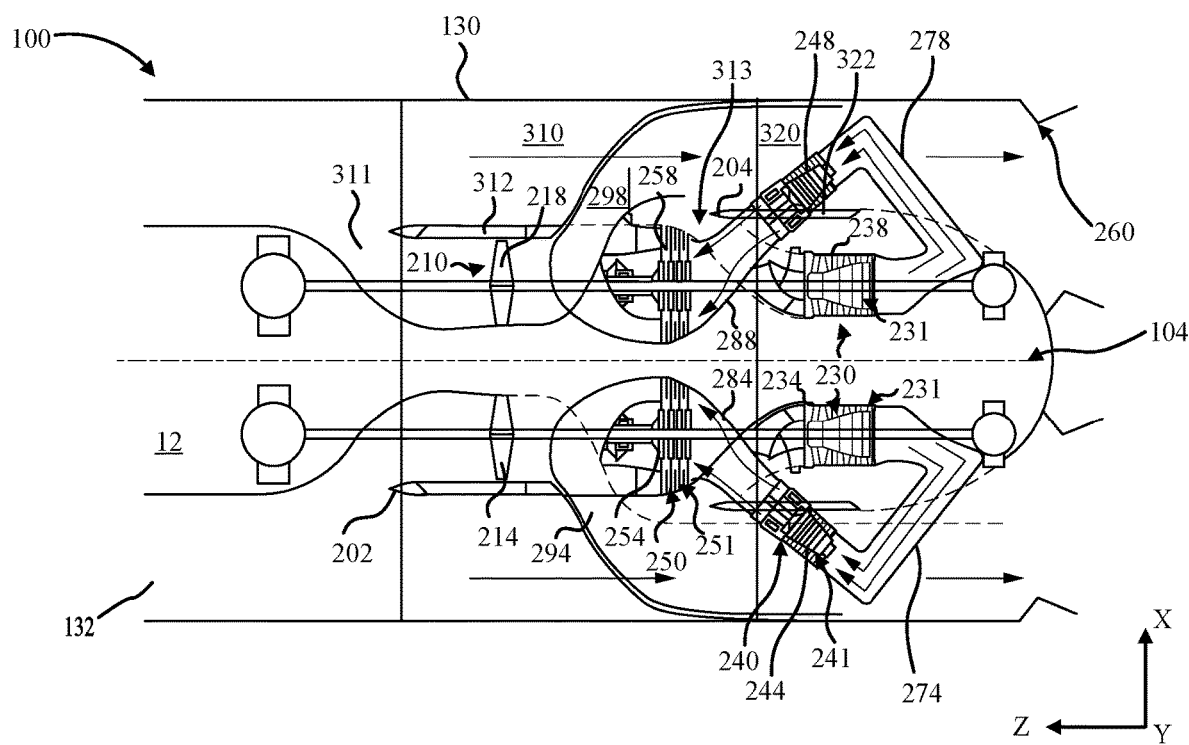
FIG. 2B illustrates a cross-section of FIG. 2A along section line 2B-2B, in accordance with various embodiments.
Figure 3:
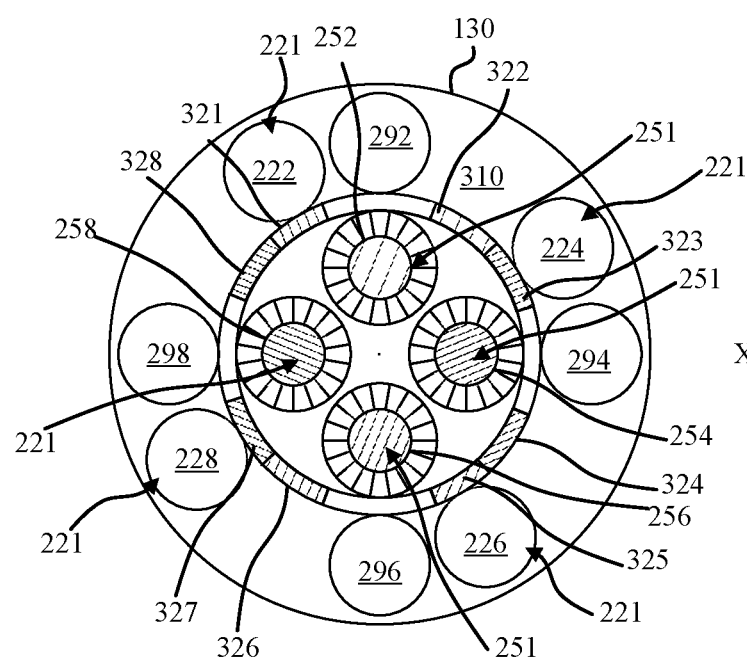
FIG. 3 illustrates a cross-section of FIG. 2A along section line 3-3, in accordance with various embodiments.
Figure 4:
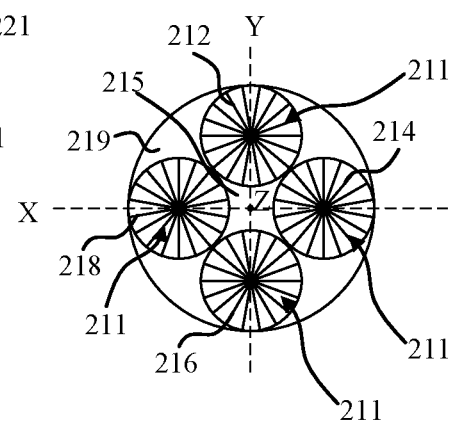
FIG. 4 illustrates a cross-section of FIG. 2A along section line 4-4, in accordance with various embodiments.
Figure 5:
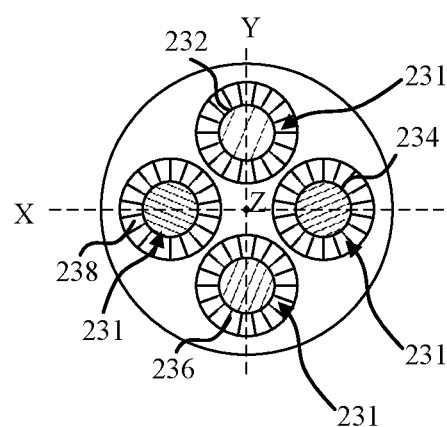
FIG. 5 illustrates a cross-section of FIG. 2A along section line 5-5, in accordance with various embodiments.

FIG. 2A illustrates a detail view of a hybrid electric gas turbine propulsion system 100. FIG. 2B illustrates a cross-sectional view of hybrid electric gas turbine propulsion system 100 along section line 2B-2B from FIG. 2A, in accordance with various embodiments. FIG. 3 illustrates a cross-sectional view of the hybrid electric gas turbine propulsion system 100 along section line 3-3 from FIG. 2A, in accordance with various embodiments. FIG. 4 illustrates a cross-sectional view of the hybrid electric gas turbine propulsion system 100 along section line 4-4 from FIG. 2A, in accordance with various embodiments. FIG. 5 illustrates a cross-sectional view of the hybrid electric gas turbine propulsion system 100 along section line 5-5 from FIG. 2A, in accordance with various embodiments. Referring now to FIGS. 2-4, the hybrid electric gas turbine propulsion system 100 comprises a fan section 210, a low pressure compressor (LPC) section 230, a gas generating core section 240, and a low pressure turbine (LPT) section 250. The fan section 210 is disposed aft of a first splitter 202. The LPC section 230 may be disposed aft of the fan section 210. The LPT section 250 may be disposed axially between the fan section 210 and the LPC section 230. The gas generating core section 240 may be disposed radially outward from the LPC section 230. The gas generating core section 240 may be disposed aft of the fan section and the LPT section 250.

In various embodiments, the flow into the inlet 132 of the hybrid electric gas turbine propulsion system 100 may be asymmetrically tuned. For example, the flow into the upper portion of inlet 132 (e.g., proximate fan 212) may be different than the lower portion of the inlet 132 (e.g., proximate fan 216). Similarly, the flow into the left side portion of inlet 132 (e.g., proximate fan 214) may be different than the right side portion of inlet 132 (e.g., proximate fan 218). In this regard, pitch and/or yaw may further be controlled by the hybrid electric gas turbine propulsion system 100. Furthermore, in accordance with various embodiments, the hybrid electric gas turbine propulsion system 100 may be configured to adjust the flow into the upper portion, the lower portion, the left side portion, and/or the right side portion during a roll maneuver of the aircraft 10 from FIG. 1 to minimize drag during a roll maneuver.

The fan section 210 comprises a plurality of fans 211 disposed circumferentially about the neutral aerodynamic axis 104. The first splitter 202 is configured to split a boundary layer flow 300 along the fuselage 12 between the fan section 210, and a bypass section 310 disposed radially outward of the fan section 210. In various embodiments, the bypass section 310 may be defined by a bypass portion 312 of fuselage 12 extending axially from an inlet 311 of the fan section 210 to an inlet 313 of the LPC section 230.

The fan section 210 may comprise a first fan 212 disposed radially outward from the neutral aerodynamic axis 104 (e.g., the Z-axis). A second fan 214 may be disposed approximately 90 degrees circumferentially about neutral aerodynamic axis 104 (e.g., the Z-axis) from first fan 212, a third fan 216 may be disposed approximate 180 degrees circumferentially about neutral aerodynamic axis 104 from first fan 212, and a fourth fan 218 may be disposed approximately 270 degrees circumferentially about neutral aerodynamic axis 104. In other words, third fan 216 may mirror first fan 212 about an X-Z plane, and the fourth fan 218 may mirror second fan 214 about a Y-Z plane. The X-Z plane may be defined by a plane extending through a centerline of shafts 126 of the second fan 214 and the fourth fan 218 and the neutral aerodynamic axis 104, and the Y-Z plane may be defined by a centerline of shafts 126 of the first fan 212 and the third fan 216 and the neutral aerodynamic axis 104. Although disclosed as being approximately 90 degrees circumferentially space between fans, any configuration including equally circumferentially spaced fans about a neutral aerodynamic axis 104 is within the scope of this disclosure. For example, three fans may each be spaced 120 degrees circumferentially about the neutral aerodynamic axis 104 in a three propulsion system configuration.

In various embodiments, the fan section 210 further comprises an inner fixed structure 215 coupling a radially inner portion of each fan in the plurality of fans 211 together. The fan section 210 may further comprise an outer fixed structure 219 disposed radially outward from the inner fixed structure 215. The outer fixed structure 219 may be coupled to a radially outer portion of each fan in the plurality of fans 211.

Each fan in the plurality of fans 211 is in fluid communication with a respective fan duct in a plurality of fan ducts 221. Each fan duct in the plurality of fan ducts 221 may extend aft and radially outward from a respective fan to a fan duct exit. For example, first fan duct 222 may extend aft and radially outward from first fan 212, second fan duct 224 may extend aft and radially outward from second fan 214, third fan duct 226 may extend aft and radially outward from third fan 216, and fourth fan duct 228 may extend aft and radially outward from fourth fan 218. In various embodiments, a centerline of the first fan duct 222 may be disposed in a first fan duct plane offset by approximately 30 degrees from Y-Z plane about neutral aerodynamic axis 104. Similarly, a centerline of the second fan duct 224 may be disposed in a second fan duct plane offset by approximately 30 degrees from the X-Z plane about neutral aerodynamic axis. The centerline of the third fan duct 226 may be disposed in the first fan duct plane, and a centerline of the fourth fan duct 228 may be disposed in the second fan duct plane. In this regard, the third fan duct 226 may mirror the first fan duct 222 about the second fan duct plane, and the fourth fan duct 228 may mirror the second fan duct 224 about the first fan duct plane.

In various embodiments, an exit of each fan duct in the plurality of fan ducts 221 may comprise a variable area nozzle at an exit of the respective fan duct. In this regard, a fan pressure ratio may be altered by changing a cross-sectional area at the variable nozzle of the respective fan duct in the plurality of fan ducts 221. In doing so, a vectoring of thrust achieved by a first fan relative to a second fan may be achieved to pitch the aircraft 10 in a first direction or a second direction or to yaw the aircraft 10 in a first direction or a second direction.

In various embodiments a fan pressure ratio may be altered by changing the speed of the shaft 126 by varying the speed of electric motor 190. In doing so, a vectoring of thrust achieved by a first fan relative to a second fan may be achieved to pitch the aircraft 10 in a first direction or a second direction or to yaw the aircraft 10 in a first direction or a second direction. For example, a first fan may partially supply a first thrust, and a second fan may partially supply a second thrust, and the first thrust and the second thrust may be different. In this regard, a left propulsion system in the plurality of propulsion system 102 may supply a greater thrust than a right propulsion system in the plurality of propulsion systems 102 to yaw the aircraft to the right. Similarly, a top propulsion system in the plurality of propulsion systems 102 may supply a greater thrust than a bottom propulsion system in the plurality of propulsions systems 102 to pitch the aircraft in a downward direction.

The LPC section 230 comprises a plurality of compressors 231 disposed circumferentially about the neutral aerodynamic axis 104. A second splitter 204 is configured to split a boundary layer flow along the fuselage 12 between the LPC section 230 and a discharge section 320 disposed radially outward of the LPC section 230. In various embodiments, the discharge section 320 may be defined by a discharge section 320 of fuselage 12 extending axially from an inlet 313 of the LPC section 230 to a nozzle section 260 of the hybrid electric gas turbine propulsion system 100. In various embodiments, the nozzle section 260 may comprise a single nozzle. In various embodiments, the nozzle section 260 may comprise a plurality of nozzles corresponding to the plurality of propulsion systems 102. The nozzle section 260 may be symmetric about the X-Z plane extending through neutral aerodynamic axis 104 for pitch control and/or symmetric about the Y-Z plane extending through neutral aerodynamic axis 104 for yaw control. In this regard, the symmetry of nozzle section 260 may provide symmetry for gross thrust. Similarly, the inlet 132 may be symmetric about the X-Z plane extending through neutral aerodynamic axis 104 for pitch control and/or symmetric about the Y-Z plane extending through the neutral aerodynamic axis 104 for yaw control. In this regard, the symmetry of the inlet 132 may provide symmetry for components of ram drag. As such, net thrust, which is equal to gross thrust minus inlet drag may be symmetric about the X-Z plane and the Y-Z plane extending through the neutral aerodynamic axis. 104.

The LPC section 230 may comprise a first compressor 232 disposed radially outward from the neutral aerodynamic axis 104 (e.g., the Z-axis). A second compressor 234 may be disposed approximately 90 degrees circumferentially about neutral aerodynamic axis 104 (e.g., the Z-axis) from first compressor 232, a third compressor 236 may be disposed approximate 180 degrees circumferentially about neutral aerodynamic axis 104 from first compressor 232, and a fourth compressor 238 may be disposed approximately 270 degrees circumferentially about neutral aerodynamic axis 104. In other words, third compressor 236 may mirror first compressor 232 about the X-Z plane, and the fourth compressor 238 may mirror second compressor 234 about the Y-Z plane. In various embodiments, by embedding each compressor in the plurality of compressors 231 radially inward of the fuselage 12, the hybrid electric gas turbine propulsion system 100 may provide reduced noise emissions relative to typical hybrid electric gas turbine propulsion system.

In various embodiments, the inlet 313 of the LPC section 230 may comprise a plurality of inlets 330. Each compressor in the plurality of compressors 231 may be configured to receive an inlet airflow from a first inlet and a second inlet in the plurality of inlets 330. For example, first compressor 232 may receive an inlet airflow from a first inlet 321 and a second inlet 322, second compressor 234 may receive an inlet airflow from a first inlet 323 and a second inlet 324, third compressor 236 may receive an inlet airflow from a first inlet 325 and a second inlet 326, and fourth compressor 238 may receive an inlet airflow from a first inlet 327 and a second inlet 328.

The gas generating core section 240 comprises a plurality of gas generating cores 241 disposed circumferentially about the neutral aerodynamic axis 104. Each gas generating core in the plurality of gas generating cores 241 may be a single spool gas generator, a dual spool gas generator, or a multi-spool gas generator. A duct extends radially outward from each compressor in the plurality of compressors 231 to a respective gas generating core in the plurality of gas generating cores 241. For example, a first duct 272 extends from an outlet of first compressor 232 to an inlet of first gas generating core 242, a second duct 274 extends from an outlet of second compressor 234 to an inlet of second gas generating core 244, a third duct 276 extends from an outlet of third compressor 236 to an inlet of third gas generating core 246, and a fourth duct 278 extends from an outlet of fourth compressor 238 to an inlet of fourth gas generating core 248.

In various embodiments, each gas generating core in the plurality of gas generating cores 241 may be a line-replaceable unit. In this regard, maintenance of the hybrid electric gas turbine propulsion system 100 may be simpler by being able to replace a gas generating core in the plurality of gas generating cores more easily relative to typical hybrid electric gas turbine propulsion systems.

The gas generating core section 240 may comprise the first gas generating core 242 disposed radially outward from the neutral aerodynamic axis 104 (e.g., the Z-axis). The second gas generating core 244 may be disposed approximately 90 degrees circumferentially about neutral aerodynamic axis 104 (e.g., the Z-axis) from first gas generating core 242, the third gas generating core 246 may be disposed approximate 180 degrees circumferentially about neutral aerodynamic axis 104 from first gas generating core 242, and the fourth gas generating core 248 may be disposed approximately 270 degrees circumferentially about neutral aerodynamic axis 104. In various embodiments, a centerline of the first gas generating core 242 may be disposed in a first gas generating core plane offset by approximately 30 degrees from Y-Z plane about neutral aerodynamic axis 104. Similarly, a centerline of the second gas generating core 244 may be disposed in a second gas generating core plane offset by approximately 30 degrees from the X-Z plane about neutral aerodynamic axis 104. The centerline of the third gas generating core 246 may be disposed in the first gas generating core plane, and a centerline of the fourth gas generating core 248 may be disposed in the second gas generating core plane. In this regard, the third gas generating core 246 may mirror the first gas generating core 242 about the second gas generating core plane, and the fourth gas generating core 248 may mirror the second gas generating core 244 about the first gas generating core plane. In various embodiments, the first fan duct plane is the first gas generating core plane, and the second fan duct plane is the second gas generating core plane.

The LPT section 250 comprises a plurality of turbines 251 disposed circumferentially about the neutral aerodynamic axis 104. A duct extends radially inward from each gas generating core in the plurality of gas generating cores 241 to a respective turbine in the plurality of turbines 251. For example, a first duct 282 extends from an outlet of first gas generating core 242 to an inlet of first turbine 252, a second duct 284 extends from an outlet of second gas generating core 244 to an inlet of second turbine 254, a third duct 286 extends from an outlet of third gas generating core 246 to an inlet of third turbine 256, and a fourth duct 288 extends from an outlet of fourth gas generating core 248 to an inlet of fourth turbine 258.

The LPT section 250 may comprise a first turbine 252 disposed radially outward from the neutral aerodynamic axis 104 (e.g., the Z-axis). A second turbine 254 may be disposed approximately 90 degrees circumferentially about neutral aerodynamic axis 104 (e.g., the Z-axis) from first turbine 252, the third turbine 256 may be disposed approximate 180 degrees circumferentially about neutral aerodynamic axis 104 from first turbine 252, and the fourth turbine 258 may be disposed approximately 270 degrees circumferentially about neutral aerodynamic axis 104. In other words, third turbine 256 may mirror first turbine 252 about the X-Z plane, and the fourth turbine 258 may mirror second turbine 254 about the Y-Z plane.

Each turbine in the plurality of turbines 251 is in fluid communication with a respective turbine exit duct in a plurality of turbine exit ducts 291. Each turbine exit duct in the plurality of turbine exit ducts 291 may extend radially outward from a respective turbine in the plurality of turbines 251. For example, first turbine exit duct 292 may extend radially outward from first turbine 252, a second turbine exit duct 294 may extend radially outward from second turbine 254, third turbine exit duct 296 may extend radially outward from third turbine 256, and fourth turbine exit duct 298 may extend radially outward from fourth turbine 258. A centerline of each turbine exit duct in the plurality of turbine exit ducts 291 may be in the same plane as a centerline of each turbine in the plurality of turbines 251. For example, third turbine exit duct 296 may mirror first turbine exit duct 292 about the X-Z plane, and the fourth turbine exit duct 298 may mirror second turbine exit duct 294 about the Y-Z plane. Each turbine exit duct in the plurality of turbine exit ducts 291 may be configured to reverse an exit flow from a respective turbine in the plurality of turbines 251 axially. For example, first turbine exit duct 292 may reverse an exit flow from the first turbine 252 traveling in the forward direction to an exit flow from the first turbine exit duct 292 in the aft direction.

In various embodiments, an exit of each turbine exit duct in the plurality of turbine exit ducts 291 may be disposed axially proximate an exit of each fan duct in the plurality of fan ducts 221. In this regard, each fan in the plurality of fans 211 is configured to pump a boundary layer flow from the fuselage and the pumped boundary layer flow may exit a respective fan duct in the plurality of fan ducts 221 and entrain an airflow output from a respective turbine exit duct in the plurality of turbine exit ducts 291 and entrain a portion of the boundary layer flow 300.

In various embodiments, each propulsion system in the plurality of propulsion systems 102 from FIG. 1 comprises a fan, a fan exit duct, a compressor, a compress-core duct, a gas generating core, a turbine, and a turbine exit duct. For example, a first propulsion system in the plurality of propulsion systems 102 comprises first fan 212, first fan duct 222, first compressor 232, first duct 272, first gas generating core 242, first duct 282, first turbine 252, and first turbine exit duct 292.

In various embodiments, by having the hybrid electric gas turbine propulsion system 100 symmetric about an X-Z plane extending through the neutral aerodynamic axis 104 and symmetric about a Y-Z plane extending through the neutral aerodynamic axis 104, the horizontal empennage 18, rudder 19 and tail 20 of an aircraft may be smaller. In this regard, the hybrid electric gas turbine propulsion system 100 may supplement the stabilizer in a tail end of aircraft 10.

In various embodiments, the hybrid electric gas turbine propulsion system 100 may be sized and configured to provide between 10% and 30% of maximum static take-off thrust and the gas turbine engines 14 coupled to wings 16 may be sized and configured to provide between 70% and 90 of maximum static take-off thrust. In various embodiments, the hybrid electric gas turbine propulsion system 100 may be sized and configured to provide between 15% and 25% of maximum static take-off thrust. In various embodiments, the hybrid electric gas turbine propulsion system 100 may be sized and configured to provide approximately 20% of maximum static take-off thrust.

Figures 6, 7:
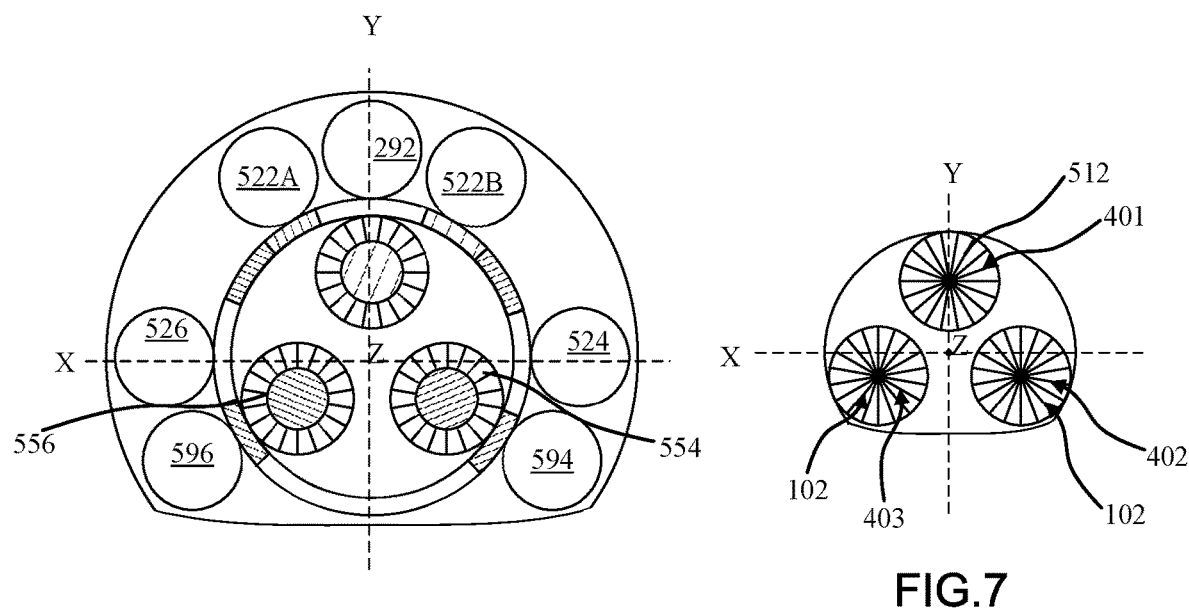
FIG. 6 illustrates a cross-section of FIG. 2A along section line 3-3, in accordance with various embodiments.
FIG. 7 illustrates a cross-section of FIG. 2A along section line 4-4, in accordance with various embodiments.

In various embodiments, referring now to FIGS. 6, and 7, a hybrid electric gas turbine propulsion system 400 having with a three propulsion system arrangement, in accordance with various embodiments, is illustrated. The gas turbine propulsion system comprises a first propulsion system 401, a second propulsion system 402, and a third propulsion system 403. The first propulsion system 401 may be disposed vertically above the X-Z plane.

In various embodiments, a three-propulsion system, as illustrated by hybrid electric gas turbine propulsion system 400 is symmetric about the Y-Z plane. In this regard, two of the three propulsion systems may be in accordance with each propulsion system in the plurality of propulsion systems 102 from FIG. 1. The third propulsion system (e.g., first propulsion system 401) may differ from propulsion systems 102 in that an exit of a first fan 512 of the first propulsion system 401 may comprise a first fan duct 522A and a second fan duct 522B. The first propulsions system may include the first fan duct 522A and the second fan duct 522B to maintain symmetry about the Y-Z plane.

In various embodiments, the first propulsion system 401 comprises a first fan 411 in fluid communication with first fan duct 522A and second fan duct 522B. In various embodiments, second propulsion system is in accordance with propulsion systems 102 clocked approximately 120 degrees from the Y-Z plane. The third propulsion system 403 is a mirror image of the second propulsion system about the Y-Z plane. For example, a second fan duct 524 of second propulsion system 402 mirrors a third fan duct 526, a second turbine exit duct 594 mirrors a turbine exit duct 596 about the Y-Z plane, a second turbine 554 mirrors a third turbine 556 about the Y-Z plane.

In various embodiments, the hybrid electric gas turbine propulsion system 400 having three propulsion systems may allow for greater ground clearance by moving the hybrid electric gas turbine propulsion system 400 vertically within a fuselage while maintaining a desired neutral aerodynamic center.

Figure 8:
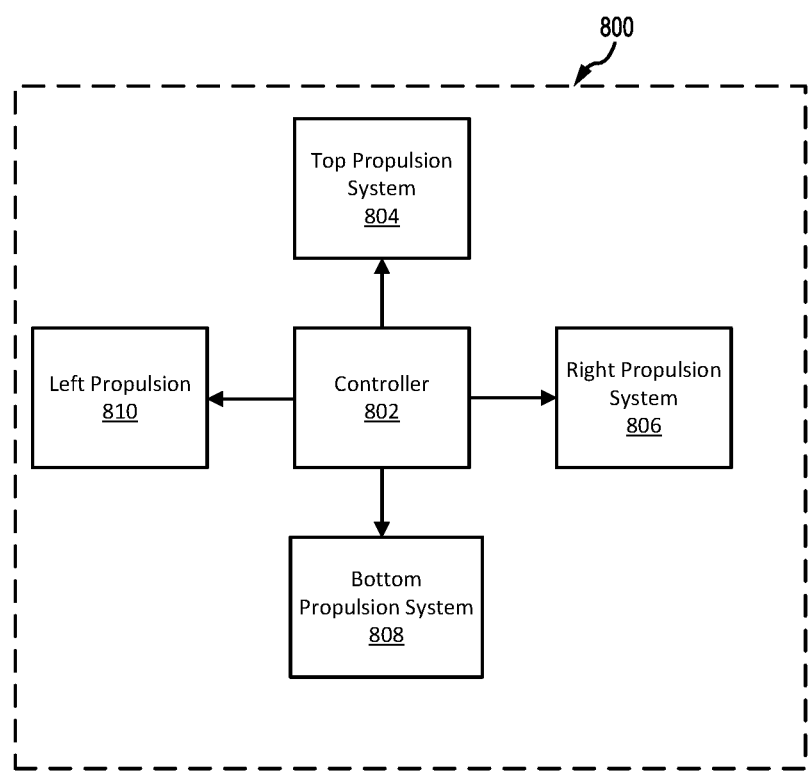
FIG. 8 illustrates a control system for a hybrid electric gas turbine propulsion system, in accordance with various embodiments.

Referring now to FIG. 8, a schematic block diagram of a control system 800 for an aircraft (e.g., aircraft 10) is illustrated. Control system 800 includes a controller 802 in electronic communication with a top propulsion system 804, a right propulsion system 806, a bottom propulsion system 808, and a left propulsion system 810. In various embodiments, controller 802 may be integrated into computer systems onboard aircraft 10. In various embodiments, controller 802 may be configured as a central network element or hub to access various systems, engines, and components of control system 800. Controller 802 may comprise a network, computer-based system, and/or software components configured to provide an access point to various systems, engines, and components of control system 800. In various embodiments, controller 802 may comprise a processor. In various embodiments, controller 802 may be implemented in a single processor. In various embodiments, controller 802 may be implemented as and may include one or more processors and/or one or more tangible, non-transitory memories and be capable of implementing logic (e.g., memory). Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 802 may comprise a processor configured to implement various logical operations in response to execution of instructions, for example, instructions stored on a non-transitory, tangible, computer-readable medium configured to communicate with controller 802.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

In various embodiments, the propulsion systems 804, 806, 808, 810 may be in accordance with the plurality of propulsion systems 102 from FIG. 1. In various embodiments, the controller 802 may be configured to yaw or pitch the aircraft (e.g., aircraft 10). For example, the controller 802 may send a command to the top propulsion system 804 to provide a top propulsion thrust and a command to the bottom propulsion system 808 to provide a bottom propulsion thrust. To pitch the aircraft down, the top propulsion thrust may be commanded to be greater than the bottom propulsion thrust. Similarly, the top propulsion thrust may be commanded to be less than the bottom propulsion thrust to pitch the aircraft up.

In various embodiments, the controller 802 may send a command to the left propulsion system 810 to provide a left propulsion thrust and a command to the right propulsion system 806 to provide a right propulsion thrust. To yaw the aircraft right, the left propulsion thrust may be greater than the right propulsion thrust. Similarly, the left propulsion thrust may be less than the right propulsion thrust to yaw the aircraft to the left.

Figure 9:
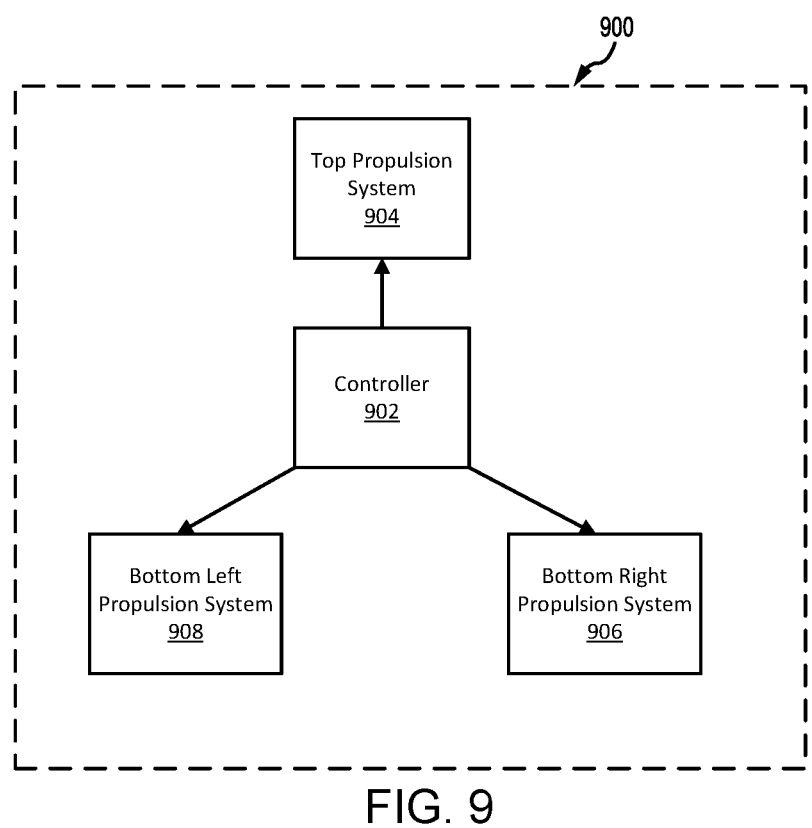
FIG. 9 illustrates a control system for a hybrid electric gas turbine propulsion system, in accordance with various embodiments.

Referring now to FIG. 9, a schematic block diagram of a control system 900 for an aircraft (e.g., aircraft 10) is illustrated. Control system 900 includes a controller 902 in electronic communication with a top propulsion system 904, a bottom right propulsion system 906, and a bottom left propulsion system 908. The propulsion systems 904, 906, 908 may be in accordance with the propulsion systems of the hybrid electric gas turbine propulsion system 400 from FIGS. 6 and 7.

In various embodiments, the controller 902 may be configured to yaw or pitch the aircraft (e.g., aircraft 10). For example, the controller 902 may send a command to the top propulsion system 904 to provide a top propulsion thrust and a command to the bottom right propulsion system 906 and the bottom left propulsion system 908 to provide a combined bottom propulsion thrust. To pitch the aircraft down, the top propulsion thrust may be commanded to be greater than the combined bottom propulsion thrust. Similarly, the top propulsion thrust may be commanded to be less than the combined bottom propulsion thrust to pitch the aircraft up.

In various embodiments, the controller 902 may send a command to the bottom left propulsion system 908 to provide a left propulsion thrust and a command to the bottom right propulsion system 906 to provide a right propulsion thrust. To yaw the aircraft right, the left propulsion thrust may be greater than the right propulsion thrust. Similarly, the left propulsion thrust may be less than the right propulsion thrust to yaw the aircraft to the left.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A hybrid electric gas turbine propulsion system, comprising:
   a first propulsion system including a first fan, a first turbine, a first compressor, and a first electric motor, the first fan operably coupled to the first turbine and the first compressor by a first shaft, the first shaft coupled to the first electric motor, and the first shaft configured to be disposed radially inward of a fuselage of an aircraft;
   a second propulsion system including a second fan, a second turbine, a second compressor, and a second electric motor, the second fan operably coupled to the second turbine and the second compressor by a second shaft, the second shaft coupled to the second electric motor, and the second shaft configured to be disposed radially inward of the fuselage of the aircraft;
   a first splitter at least partially defining a first inlet of the first fan, the first inlet in fluid communication with the first fan; and
   a second splitter at least partially defining a second inlet of the first compressor, the second splitter disposed aft of the first splitter, the second splitter configured to split a turbine discharge flow.

2. The hybrid electric gas turbine propulsion system of claim 1, wherein
   the first fan mirrors the second fan about a plane that extends from a neutral aerodynamic axis of the aircraft through a longitudinal axis of the first shaft,
   the longitudinal axis is parallel to the neutral aerodynamic axis, and
   the longitudinal axis is disposed radially outward of the neutral aerodynamic axis.

3. The hybrid electric gas turbine propulsion system of claim 1, wherein:
   the hybrid electric gas turbine propulsion system is configured to provide a pitch control of the aircraft, and
   the pitch control includes supplying a first pitch thrust in the first propulsion system and providing a second pitch thrust in the second propulsion system, the first pitch thrust being greater than the second pitch thrust.

4. The hybrid electric gas turbine propulsion system of claim 1, further comprising a gas generating core fluidly coupled to the first compressor and the first turbine, the gas generating core configured to be disposed radially outward from the first compressor.

5. The hybrid electric gas turbine propulsion system of claim 1, wherein, the first fan and the second fan are each configured to ingest a first portion of a boundary layer flow from the fuselage.

6. The hybrid electric gas turbine propulsion system of claim 5, wherein the first compressor and the second compressor are each configured to ingest a second portion of the boundary layer flow from the fuselage, the second portion of the boundary layer flow disposed aft of the first portion of the boundary layer flow.

7. The hybrid electric gas turbine propulsion system of claim 1, further comprising a third propulsion system including a third fan, a third turbine, a third compressor, and a third electric motor, the third fan operably coupled to the third turbine and the third compressor by a third shaft, the third shaft coupled to the third electric motor, the third shaft configured to be disposed radially inward of the fuselage of the aircraft, wherein the first propulsion system, the second propulsion system and the third propulsion system each comprise the first splitter and the second splitter, wherein a fan exhaust of the first fan, the second fan, and the third fan are respectively configured to mix with a turbine exhaust of the first turbine, the second turbine, and the third turbine, and a bypass airflow.

8. The hybrid electric gas turbine propulsion system of claim 7, further comprising a fourth propulsion system including a fourth fan, a fourth turbine, a fourth compressor, and a fourth electric motor, wherein:
   the fourth fan is operably coupled to the fourth turbine and the fourth compressor by a fourth shaft,
   the fourth shaft is coupled to the fourth electric motor, and
   the fourth shaft disposed radially inward of the fuselage of the aircraft.

9. A boundary layer impulse propulsion system, comprising:
   a fan section disposed radially inward of a fuselage of an aircraft, the fan section including a plurality of fans disposed circumferentially about a neutral aerodynamic axis of the fuselage, and the fan section configured to ingest a first boundary layer airflow from the fuselage, the plurality of fans including at least three fans, each fan in the plurality of fans coupled to a corresponding shaft of a plurality of shafts;
   a turbine section disposed aft of the fan section, the turbine section including a plurality of turbines, the plurality of turbines including at least three turbines; and a compressor section disposed aft of the turbine section, the compressor section including a plurality of compressors, the compressor section configured to ingest a second boundary layer flow from the fuselage, and each compressor in the compressor section being in fluid communication with a respective turbine in the turbine section.

10. The boundary layer impulse propulsion system of claim 9, wherein
a first fan of the plurality of fans mirrors a second fan of the plurality of fans about a plane that extends from the neutral aerodynamic axis of the aircraft through a longitudinal axis of a first shaft,
the longitudinal axis is parallel to the neutral aerodynamic axis,
the longitudinal axis is disposed radially outward of the neutral aerodynamic axis, and
the first shaft is operably coupled to the first fan in the plurality of fans, a first turbine in the plurality of turbines, and a first compressor in the plurality of compressors.

11. The boundary layer impulse propulsion system of claim 9, further comprising a plurality of fan exit ducts, each fan in the plurality of fans fluidly coupled to a respective fan exit duct in the plurality of fan exit ducts.

12. The boundary layer impulse propulsion system of claim 11, further comprising a plurality of turbine exit ducts, each turbine in the plurality of turbine exit ducts fluidly coupled to a respective turbine exit duct in the plurality of turbine exit ducts.

13. The boundary layer impulse propulsion system of claim 12, wherein each turbine exit duct is configured to reverse an exit airflow of a respective turbine from a forward direction to an aft direction.

14. The boundary layer impulse propulsion system of claim 13, wherein each turbine exit duct includes a turbine duct exit axially proximate a fan duct exit of each fan in the plurality of fans.

15. The boundary layer impulse propulsion system of claim 9, wherein:
the boundary layer impulse propulsion system is configured to provide at least one of a pitch control and a yaw control of the aircraft, and
the pitch control or the yaw control includes supplying a first pitch thrust in a first propulsion system and providing a second pitch thrust in a second propulsion system, the first pitch thrust being greater than the second pitch thrust.

16. An aircraft, comprising:
a fuselage extending from a forward end to an aft end, the fuselage defining a neutral aerodynamic axis; and
a plurality of propulsion systems disposed proximate the aft end of the fuselage, wherein:
at least a portion of each propulsion system in the plurality of propulsion systems is disposed inwardly of the fuselage, wherein:
each propulsion system in the plurality of propulsion systems is configured to ingest a boundary layer flow from the fuselage,
a first fan of a first propulsion system in the plurality of propulsion systems mirrors a second fan of a second propulsion system in the plurality of propulsion systems about a plane extending through the neutral aerodynamic axis, and a longitudinal axis of a propulsion system in the plurality of propulsion systems, and
the first fan, the second fan, and a third fan of a third propulsion system in the plurality of propulsion systems are disposed circumferentially about the neutral aerodynamic axis of the fuselage.

17. The aircraft of claim 16, wherein each propulsion system in the plurality of propulsion systems include a fan operably coupled to a turbine and a compressor by a shaft, and an electric motor coupled to the shaft.

18. The aircraft of claim 17, wherein each propulsion system in the plurality of propulsion systems includes a gas generating core disposed radially outward from the shaft, the gas generating core in fluid communication with the compressor and the turbine.

19. The aircraft of claim 16, further comprising a nozzle section disposed proximate the aft end of the fuselage, the nozzle section configured to receive a mixture of a bypass airflow, a fan exhaust airflow from each fan, and a turbine exhaust airflow from each turbine.

20. The aircraft of claim 16, wherein the plurality of propulsion systems are configured to provide at least one of pitch control and yaw control of the aircraft.

* * * * *